US012647347B2

(12) United States Patent
Naeimi et al.

(10) Patent No.: US 12,647,347 B2
(45) Date of Patent: Jun. 2, 2026

(54) NETWORK INTERFACE DEVICE-BASED COMPUTATIONS

(71) Applicant: Intel Corporation, Santa Clara, CA (US)

(72) Inventors: Helia A. Naeimi, Sunnyvale, CA (US); Amedeo Sapio, San Jose, CA (US); John Andrew Fingerhut, Cary, NC (US); Yi Li, Fremont, CA (US); Yanfang Le, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/200,342

(22) Filed: May 22, 2023

(65) Prior Publication Data

US 2023/0300063 A1 Sep. 21, 2023

Related U.S. Application Data

(63) Continuation-in-part of application No. 17/515,222, filed on Oct. 29, 2021, now Pat. No. 12,413,516.

(51) Int. Cl.
  *H04L 45/16* (2022.01)
  *H04L 69/22* (2022.01)
(52) U.S. Cl.
  CPC .............. *H04L 45/16* (2013.01); *H04L 69/22* (2013.01)
(58) Field of Classification Search
  CPC ................................ H04L 45/16; H04L 69/22
  See application file for complete search history.

(56) References Cited

U.S. PATENT DOCUMENTS

| | | |
|---|---|---|
| 10,050,854 B1 | 8/2018 | Licking et al. |
| 10,771,401 B2 | 9/2020 | Javadi et al. |
| 10,986,042 B2 | 4/2021 | Javadi et al. |
| 11,057,318 B1 | 7/2021 | Matthews et al. |
| 2011/0188372 A1 | 8/2011 | Yalagandula et al. |
| 2015/0127763 A1* | 5/2015 | Pope ..................... G06F 13/385 709/212 |
| 2016/0155470 A1* | 6/2016 | Toma ................. H04N 21/4825 386/355 |

(Continued)

FOREIGN PATENT DOCUMENTS

| WO | 2018125462 A1 | 7/2018 |
|---|---|---|

OTHER PUBLICATIONS

Anirudh Sarma et al: "NFSlicer: Data Movement Optimization for Shallow Network Functions", arxiv.org, Cornell University Library, 201 Olin Library Cornell University Ithaca, NY 14853, Mar. 4, 2022 (Mar. 4, 2022), 13 pages.

(Continued)

*Primary Examiner* — Habte Mered
*Assistant Examiner* — Tracy Lauren Raimondo
(74) *Attorney, Agent, or Firm* — Compass IP Law PC

(57) ABSTRACT

Examples described herein relate to a network interface device. The network interface device can include circuitry that is to: receive a first packet comprising a first packet header and a first packet payload; receive multiple subsequent packets comprising multiple packet headers for respective multiple subsequent packets; update at least one of the multiple packet headers; and construct egress packets. In some examples, the egress packets include respective one of the multiple packet headers and the first packet payload.

20 Claims, 13 Drawing Sheets

(56) References Cited

U.S. PATENT DOCUMENTS

| | | | | |
|---|---|---|---|---|
| 2017/0339166 A1* | 11/2017 | Althouse | ............. | H04L 63/1416 |
| 2018/0270146 A1* | 9/2018 | Jiang | ........................ | H04L 45/16 |
| 2019/0207696 A1* | 7/2019 | Chang | .................... | H04J 3/0682 |
| 2019/0306288 A1* | 10/2019 | Reinbold | ................ | H04L 47/36 |
| 2020/0235862 A1* | 7/2020 | Di Taranto | ............ | H04L 1/1861 |
| 2021/0194831 A1* | 6/2021 | Huang | .................... | H04L 49/90 |
| 2022/0060418 A1 | 2/2022 | Le et al. | | |
| 2022/0200820 A1* | 6/2022 | Xie | ..................... | H04L 12/4633 |
| 2022/0417323 A1* | 12/2022 | Julien | ................ | H04L 47/2441 |

OTHER PUBLICATIONS

Extended European Search Report for Patent Application No. 23216918.5, Mailed May 7, 2024, 8 pages.
Broadcom, Data Sheet, "BCM88690 9.6-Tb/s Integrated Packet Processor, Traffic Manager, and Fabric Interface Single-Chip Device", Feb. 15, 2023, 98 pages.
Broadcom, Product Brief, "BCM88690 StrataDNX™ 10 Tb/s Scalable Switching Device", Mar. 2018, 2 pages.
Chen, Ge et al., "P4COM: In-Network Computation with Programmable Switches", Jul. 29, 2021, 10 pages.
Cheng, Peng, et al., "Catch the Whole Lot in an Action: Rapid Precise Packet Loss Notification in Data Center", USENIX, This paper is included in the Proceedings of the 11th USENIX Symposium on Networked Systems Design and Implementation (NSDI '14). Apr. 2-4, 2014 • Seattle, WA, USA, https://www.usenix.org/system/files/conference/nsdi14/nsdi14-paper-cheng.pdf, 13 pages.
Cope, Steve, "Understanding IP Multicasting", http://www.steves-internet-guide.com/introduction-multicasting/, May 12, 2022, 11 pages.
Gazettabyte, "Broadcom's 14.4-terabit Jericho2c+ router chip", telecom datacom, Nov. 17, 2020, 7 pages.
Gebara, Nadeen, et al., "In-Network Aggregation for Shared Machine Learning Clusters", Proceedings of the 4th MLSys Conference, San Jose, CA, USA, 2021. Copyright 2021, 16 pages.
Handley, Mark, et al., "Re-architecting datacenter networks and stacks for low latency and high performance", Proceedings of SIGCOMM '17, Los Angeles, CA, USA, Aug. 21-25, 2017, https://dl.acm.org/doi/pdf/10.1145/3098822.3098825, 14 pages.
International Search Report and Written Opinion for PCT Patent Application No. PCT/US22/42362, Mailed Dec. 14, 2022, 12 pages.
Lao, ChonLam et al., "ATP: In-network Aggregation or Multi-tenant Learning", This paper is included in the Proceedings of the 18th USENIX Symposium on Networked Systems Design and Implementation, Apr. 2021, 22 pages.
Liu, Shuo, et al., "NetReduce: RDMA-Compatible In-Network Reduction for Distributed DNN Training Acceleration", https://arxiv.org/pdf/2009.09736.pdf, Sep. 21, 2020, 15 pages.
Rouse, Margaret, "What Does Virtual Switch Mean?", https://www.techopedia.com/definition/27140/virtual-switch-vswitch, Apr. 13, 2012.
Sapio, Amedeo et al., "In-Network Computation is a Dumb Idea Whose Time Has Come", HotNets-XVI, Nov. 30-Dec. 1, 2017, Palo Alto, CA, USA, 7 pages.
Sapio, Amedeo et al., "Scaling Distributed Machine Learning with In-Network Aggregation", This paper is included in the Proceedings of the 18th USENIX Symposium on Networked Systems Design and Implementation, Apr. 2021, 25 pages.
U.S. Appl. No. 18/200,342, Figure 1 Known Prior Art, Jul. 2021.

* cited by examiner

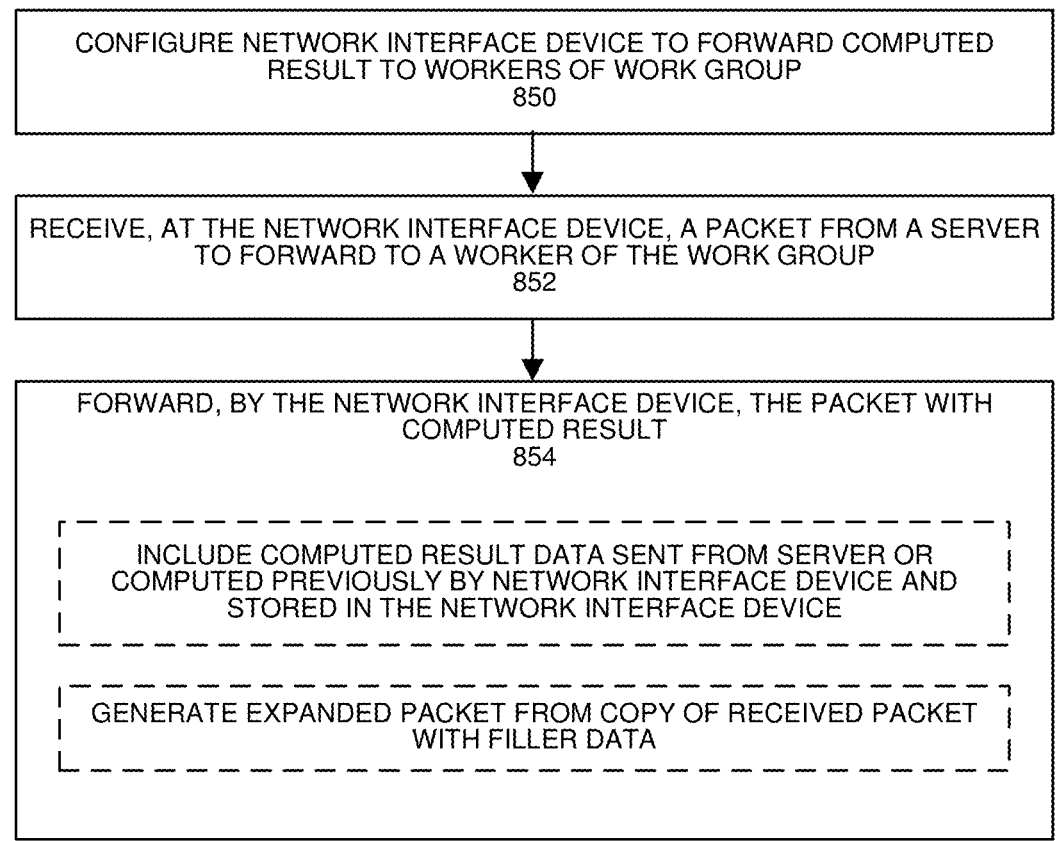

CONFIGURE NETWORK INTERFACE DEVICE TO FORWARD COMPUTED
RESULT TO WORKERS OF WORK GROUP
850

RECEIVE, AT THE NETWORK INTERFACE DEVICE, A PACKET FROM A SERVER
TO FORWARD TO A WORKER OF THE WORK GROUP
852

FORWARD, BY THE NETWORK INTERFACE DEVICE, THE PACKET WITH
COMPUTED RESULT
854

INCLUDE COMPUTED RESULT DATA SENT FROM SERVER OR
COMPUTED PREVIOUSLY BY NETWORK INTERFACE DEVICE AND
STORED IN THE NETWORK INTERFACE DEVICE

GENERATE EXPANDED PACKET FROM COPY OF RECEIVED PACKET
WITH FILLER DATA

NETWORK INTERFACE DEVICE-BASED COMPUTATIONS

RELATED APPLICATION

The present application is a continuation-in-part of U.S. patent application Ser. No. 17/515,222, filed Oct. 29, 2021. The contents of that application are incorporated herein in their entirety.

BACKGROUND

FIG. 1 shows a traditional end-to-end Solution for machine learning (ML) training using a parameter server (PS) architecture. The PS architecture includes workers 100 and parameter servers (PS) 120 that are communicatively coupled using switches 110. An end-to-end solution for PS architecture includes reduce-scatter and Allgather operators. When a job starts, if the system uses the remote direct memory access (RDMA) reliable connection (RC) (RDMA RC) (e.g., Internet Engineering Task Force (IETF) Network Working Group RFC 5040 "A Remote Direct Memory Access Protocol Specification") as the network transport protocol, a worker sets up an RC queue pair with at least one PS. FIG. 1 shows Worker1 has three queue pairs (QPs), and the QPs connect to a PS. Worker2 and Worker3 also utilize three QPs, and the QPs connect to a PS.

In the reduce-scatter operator, a worker sends a partition of the data to a corresponding PS. For example, partition a1 from Worker1, a2 from Worker2 and a3 from Worker3 are sent to PS1, partition b1 from worker1, b2 from worker2, and b3 from worker3 are sent to PS2 and similar pattern applies to the PS3. As a result, the data are scattered across multiple parameter servers to leverage the parallel computation of, e.g., graphics processing units (GPUs) located at a parameter server. After receiving the data, the PS first performs aggregation over the data from the workers. Next, the PS utilizes a GPU to perform computation, e.g., optimization over the aggregated data. Note that the parameter servers and workers can be implemented as processes, which can be executed at a same machine or same GPU.

In the Allgather operator, the data that are processed by a GPU are multicast to the workers. A parameter server sends the same copy of the data to the workers. In this process, the bandwidth from one parameter server is distributed to all the workers, and the network could be the bottleneck.

BRIEF DESCRIPTION OF THE DRAWINGS

FIGS. 8A and 8B depict example processes.

DETAILED DESCRIPTION

Figure 1:
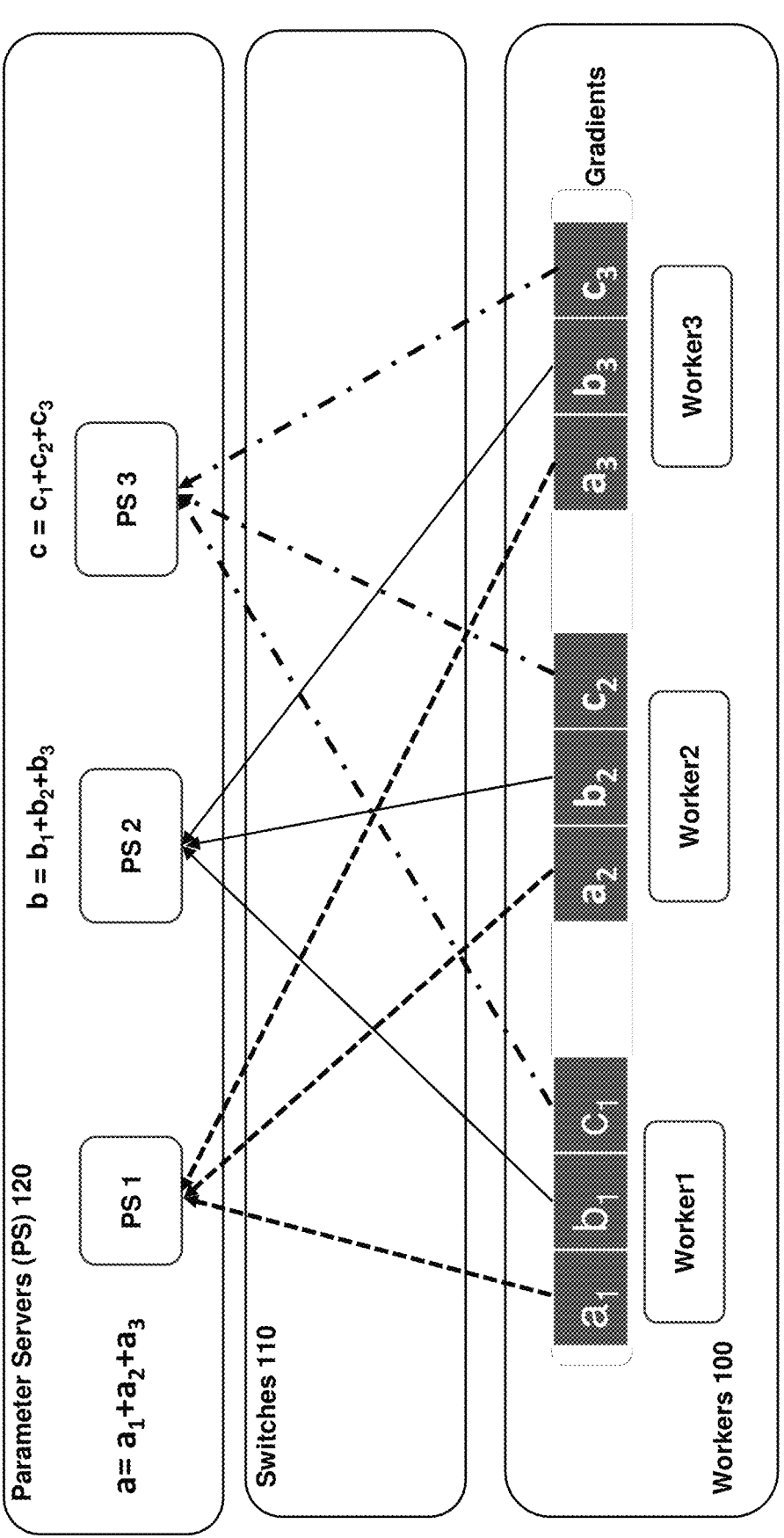
FIG. 1 depicts an example system.

For communications involving, e.g., a neural network, remote direct memory access (RDMA) reliable connection (RC) (RDMA RC) is connection-based and tracks received packets at the end host or node (e.g., a worker or parameter server of FIG. 1). If a packet does not arrive at the receiver, packet retransmission can be triggered. The connection semantic can break when a switch performs in-network computation by processing a packet, instead of a host, and drops the packet intentionally to reduce the network traffic. Thus, if an expected packet is not received at an end-host receiver, the end host is not able to distinguish if the switch consumes a packet intentionally (e.g., terminates the packet) or the network drops the packet due to the buffer overflow or corruption. However, dropping packets can break a connection in communications based on RDMA RC.

In-network compute (INC) can utilize different transport protocol implementations. In network interface controller-reliable connection (NIC-RC), the hosts are the transport protocol end-points. The networking switch device can perform the collective operation. Accordingly, the end hosts are to receive packets to implement the reliable connection. Use of INC can reduce bandwidth (BW) utilization by performing the collective operation in a network device (e.g., switch). If the original full packet is sent, then no BW saving is achieved because there is reduction in packet size. To achieve the BW requirement reduction goal, the networking switch device can reduce size of transmitted packets after a collective operation in the network. This can preserve the downstream BW during ReduceScatter. Similarly, a reverse action during AllGather can preserve up-stream BW. During AllGather, a host can stream its data to other hosts. A NIC-RC can preserve the upstream BW by the source host only sending one copy of the data, the network device keeping a copy of the payload, the source host sending header-only packets to the destination hosts, and the networking switch device expanding header-only packet to full payload sizes (e.g., up to maximum transmission unit (MTU) packet size).

In some examples, programmable match-action circuitry of an ingress pipeline or egress pipeline of a network interface device can perform computation on data at least in connection with reduce-scatter and Allgather processes. By leveraging programmability of the ingress pipeline or egress pipeline, reduce-scatter process causes the ingress pipeline or egress pipeline to perform an aggregation phase (e.g., summation, min-max, and so forth) and/or multicast operation of an Allgather phase. The multicast operation can involve the PS sending a full payload packet to the network interface device (e.g., switch 110) and with the network interface device storing the payload. The network interface device can receive a dummy packet (e.g., packet with a header but no data in a packet payload) from the PS and the network interface device can insert or replace the payload of the dummy packet with the stored payload to provide an updated packet and forward the updated packet to one or more worker.

A packet may refer to various formatted collections of bits that may be sent across a network, such as Ethernet frames, Internet Protocol (IP) packets, Transmission Control Protocol (TCP) segments, User Datagram Protocol (UDP) datagrams, etc. For example, a packet can include one or more headers and a payload and encapsulate one or more packets having headers and/or payloads. One or more headers can include one or more of: Ethernet header, IP header, TCP header, UDP header, or InfiniBand Trade Association (IBTA) header. A header can be used to control a flow of the packet through a network to a destination. A header can include information related to addressing, routing, and protocol version. For example, an IP header can include information about the version of the IP protocol, the length of the header, the type of service used, the packet's Time to Live (TTL), the source and destination address. For example, a header can include N-tuple information such as source address, destination address, IP protocol, transport layer source port, and/or destination port.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be differentiated at a finer granularity by using N-tuples (e.g., source address, destination address, IP protocol, transport layer source port, and/or destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

Reference to flows can instead or in addition refer to tunnels (e.g., Multiprotocol Label Switching (MPLS) Label Distribution Protocol (LDP), Segment Routing over IPv6 dataplane (SRv6) source routing, VXLAN tunneled traffic, GENEVE tunneled traffic, virtual local area network (VLAN)-based network slices, technologies described in Mudigonda, Jayaram, et al., "Spain: Cots data-center ethernet for multipathing over arbitrary topologies," NSDI. Vol. 10. 2010 (hereafter "SPAIN"), and so forth.

In a reduce-scatter phase, one or more workers can send full payload packets to the network interface device, and the network interface device forwards header packets (e.g., packets with headers but no payload) to the PS before receiving a total number of workers' packets. When the network interface device receives the total number of workers' packets, network interface device forwards a packet with computed results to the PS. For forwarded packets where a payload is added or removed, header fields can be updated as described herein.

In an Allgather phase, the PS can send a full payload packet (e.g., packet with header and payload) to one worker through the network interface device. Data in the full payload packet can be the same or different from the payload with computed results received from the network interface device. PS can send a set of header packets (e.g., packets with headers but not payloads) to the other workers through the network interface device. Network interface device can forward packets to workers. Network interface device can store the payload from the full payload packet and insert the stored payload into a payload of the header packets. Worker can receive at least one full payload packet. For forwarded packets where a payload is added or removed, header fields can be updated as described herein.

In a reduce-scatter phase, workers can send full payload packets to the network interface device and the network interface device forwards headers of the full payload packets (e.g., header packets) to the PS. The network interface device stores the computed result to be inserted into a header packet. For forwarded packets where a payload is added or removed, header fields can be updated as described herein.

In an Allgather phase, the PS can send header packets to the network interface device, the network interface device inserts the stored computed result from a reduce-scatter phase into the header packets, and forwards the packets with the computed results to workers. For forwarded packets where a payload is added or removed, header fields can be updated as described herein.

In some examples of INC, a switch (or other network interface device) can store a single-segment packet (e.g., header-only or dummy packet) and when scheduling such packet for dequeue, the switch can expand the packet by reading a packet segment multiple times instead of a single time, where a number of times the segment is read before it is released can be based on a size of the expanded packet. In the expanded packet, the switch can replace don't care data or filler data of the replicated packet with data (e.g., data from another packet, computed data, or stored data) and insert an end of packet marker. Accordingly, multiple copies of a single-segment packet can be inserted into a packet processing pipeline and the packet processing pipeline can insert data into empty or don't care portions of the expanded packet.

Figure 2:
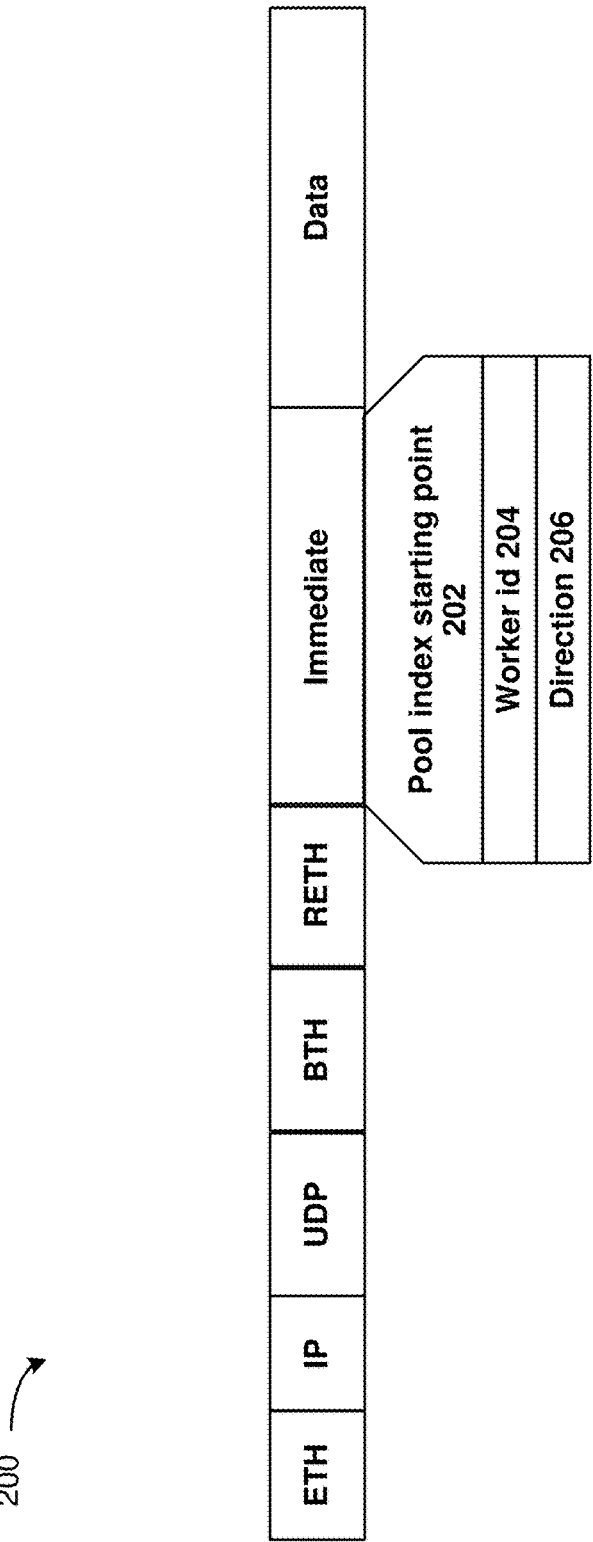
FIG. 2 depicts an example packet format that can be utilized by a sender worker or sender parameter server.

FIG. 2 depicts an example packet format that can be utilized by a sender worker or sender parameter server. Packet 200 can be implemented as RDMA over Converged Ethernet (RoCE) v2 consistent packet, although other packet formats and packet specifications can be used. For example, a RoCE v2 packet can be utilized to transmit data from a worker to a parameter server or a parameter server to worker. Supplement to InfiniBand™ Architecture Specification Volume 1 Release 1.2.1, Annex A17: RoCEv2 (2014) provides an example description of various headers in packet 200. Field Immediate can include an RDMA header that is 32 bits and incudes user defined data. In some examples, field Immediate of packet 200 can include at least pool index starting point 202, worker identifier (id) 204, and direction or operation 206.

Field pool index starting point 202 can allow support of multiple parameter servers and to attempt to avoid overlapped pool slots. To process data in a network interface device, data can be stored in a slot in memory of the network interface device. A pool can include multiple packet memory slots and field pool index starting point 202. Field pool index starting point 202 can identify a particular slot in memory that is to store data of the packet that is an offset from a starting point computed based on packet sequence number in the base transport header (BTH) field. An endpoint sender can set a value of field pool index starting point 202 and the field can be assigned by a job scheduler (e.g., orchestrator) when or before a workload starts.

A job scheduler can share job parameters with a software defined networking (SDN) controller such as Reduction ID, rank, total number of workers. The SDN controller can assign a number of slots per reduction such as a range of memory slots, starting index that is no more than the slot number of packets in flight. Slots can be released at the end of the job In some examples, a queue pair (QP) packet sequence number (PSN) can be initialized to be zero. Based on field pool index starting point, a network interface device can calculate a slot id. A QP at a parameter server (PS) can be associated with a memory region of PS and a PS allocates a same memory region for the set of QPs. Data can be aggregated in a memory region of a switch or network interface device. PS's memory region can be used to receive aggregated data from a switch or network interface device.

Field worker id 204 can identify a particular worker that sent or received data in the packet. A receiver network interface device can utilize field worker id 204 to count a number of workers that have provided data for processing by the receiver network interface device to ensure that workers in a group of workers have supplied data for processing prior to providing processed data to a host system.

Description next turns to an example use of fielder worker id 204. Worker identifier values can be used by a network interface device to distinguish different operations and determine if workers of a group of workers have all contributed data. In some examples, a worker id can be converted to a bitmap by the network interface device. For example, the worker with ID 1 carries value of 1, which is converted to 00010. Table 2 depicts an example of conversion from worker ID to bitmap. Bitmaps can be added to track a number of workers that have sent packets to the network interface device.

TABLE 2

| Worker ID | Bitmap |
| --- | --- |
| 0 | 00001 |
| 1 | 00010 |
| 2 | 00100 |
| 3 | 01000 |
| 4 | 10000 |

Data contribution tracking from workers can take place by adding bitmaps associated with workers that have contributed data to the network interface device. In this example, contributions of 5 workers are tracked. Table 3 depicts an example of counting of data contributions by workers.

TABLE 3

| Slot ID | Bitmap | Counter | Aggregator value field |
| --- | --- | --- | --- |
| 1 | 00101 | 2 | Data |
| 2 | 00000 | 0 | No data |
| 3 | 00111 | 3 | Data |
| 4 | 01101 | 3 | Data |
| 5 | 10101 | 3 | Data |

Column Slot ID can be a memory slot to use to store data resulting from a computation operation by the network interface device. A slot has an associated bitmap to track the number of workers that have contributed data to the computation. Column counter can be used to track how many different workers are provided data to be used in the computation. For example, a computation can include sum, write, or read.

In this example in Table 3, 5 slots are used to store data aggregated from 5 workers. Slot ID=1 has received data from two workers (e.g., workers 0 and 2), slot ID=2 has received no data, slot ID=3 has received data from three workers (e.g., workers 0-2), and so forth. After data has been received from workers 0-4, a computation operation can be performed and the resulting computation can be copied from the memory slot associated with the slot ID and sent to the host. Aggregated computation data can be stored in a register or memory prior to being copied or sent to the host.

A network interface device can inform an orchestrator of memory addresses or slots available to store packet data. The orchestrator can oversee memory use in the network interface device. The field pool index start point and worker identifier fields can be assigned by the orchestrator and conveyed to the endpoint sender. When a job starts, the orchestrator can allocate the memory region, e.g., register range, to one or more associated PS(s), and allocate the worker id to the associated worker(s). In some examples, the immediate field can be populated by a sender worker or sender PS for a write or WRITE-ONLY request.

Field direction 206 can include an operation for the network interface device to perform on data received in a packet. For example, a value of 0 can indicate a reduce-scatter operation is to be performed. A value of 1 can indicate an Allgather operation is to be performed. Other operations can be performed such as Allreduce, which can be a combination of ReduceScatter and Allgather.

Figure 3:
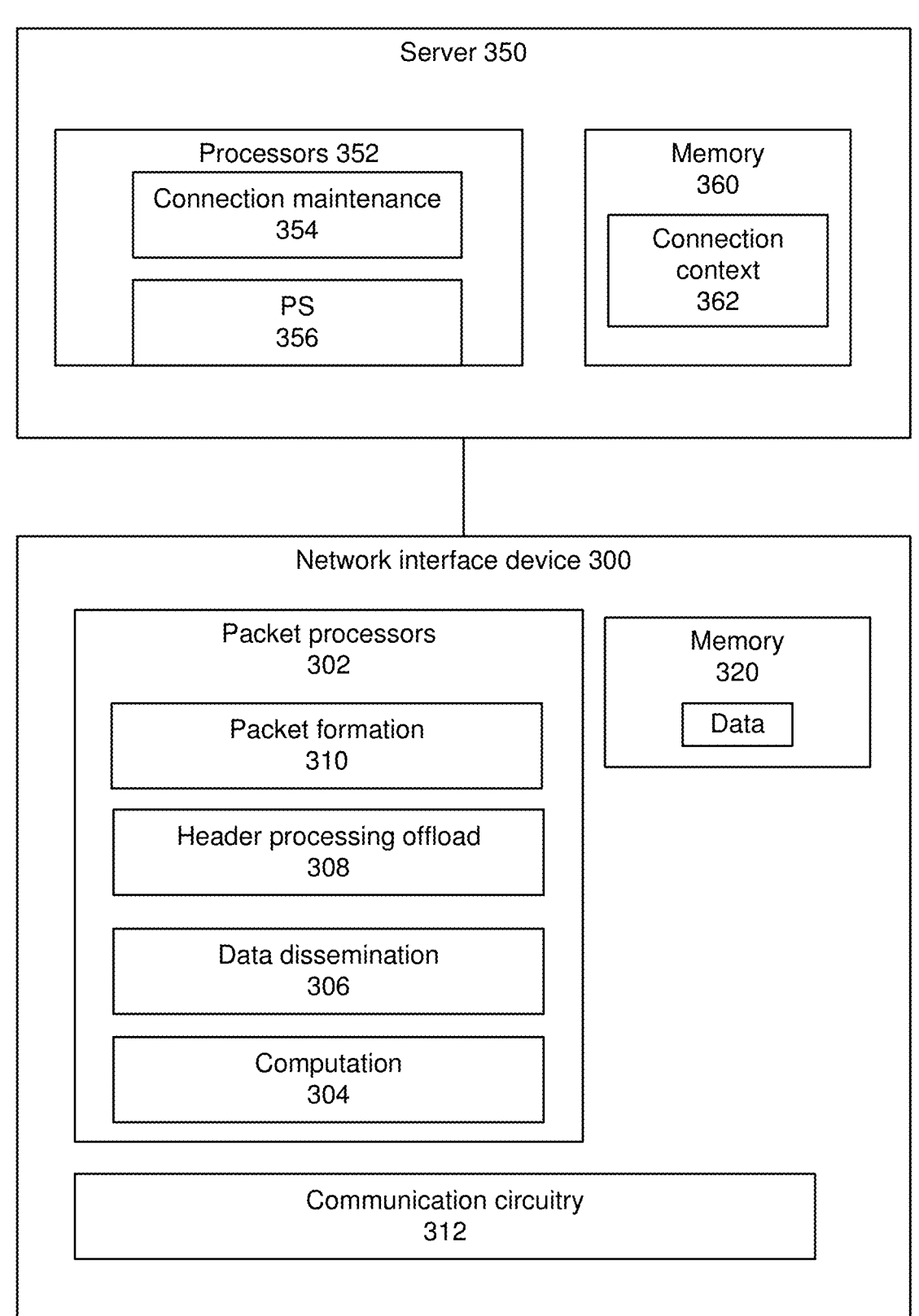
FIG. 3 depicts an example system.

FIG. 3 depicts an example system. The system can be part of a distributed ML or DNN system that is trained or performs inferences consistent with SwitchML, Message Passing Interface (MPI), Symmetric Hierarchical Memory Access (SHMEM), Unified Parallel C (UPC), or others. Network interface device 300 can be implemented as one or more of: network interface controller (NIC), SmartNIC, router, switch, forwarding element, infrastructure processing unit (IPU), data processing unit (DPU), network-attached appliance (e.g., storage, memory, accelerator, processors, security), and so forth. Network interface device 300 can be implemented as one or more of: one or more processors; one or more programmable packet processing pipelines; one or more accelerators; one or more hardware queue managers (HQM), one or more application specific integrated circuits (ASICs); one or more field programmable gate arrays (FP-GAs); one or more graphics processing units (GPUs); one or more memory devices; one or more storage devices; one or more interconnects; one or more network interface devices; one or more servers; one or more computing platforms; a composite server formed from devices connected by a network, fabric, or interconnect; one or more accelerator devices; or others.

Communication circuitry 312 can provide communications with other devices over a network or fabric via one or more ports. Communication circuitry 312 can may be configured to use any one or more communication technology (e.g., wired or wireless communications) and associated protocols (e.g., Ethernet, InfiniBand®, Bluetooth®, Wi-Fi®, 4G LTE, 5G, etc.) to perform such communication. Communication circuitry 312 can include one or more network hardware resources, such as ingress queues, egress queues, crossbars, shared memory switches, media access control (MAC), physical layer interface (PHY), Ethernet port logic, and other network hardware resources.

Network interface device 300 can utilize packet processors 302 to process received packets and to prepare packets for transmission. For example, computation 304 can perform one or more of: summation of packet data with other packet data from other workers, multiplication, division, min-max, or other data computation operations related to Allreduce, ReduceScatter, or Allgather. Packet header and data can be stored in memory 320.

Data dissemination 306 can perform distribution of data and/or packets generated by computation 304 from a PS to one or more associated workers or from one or more associated workers to a PS in accordance with Allreduce, ReduceScatter, or Allgather operations.

Header processing offload 308 can send or copy packet headers via a packet and/or direct memory access (DMA) copy operation to a server 350 executing a PS. Operation of packet processors 302 can be programmed using one or more of: configuration file, OneAPI, Programming protocol independent packet processors (P4), Software for Open Networking in the Cloud (SONiC), Broadcom® Network Programming Language (NPL), NVIDIA® CUDA®, NVIDIA® DOCA™, Data Plane Development Kit (DPDK), OpenDataPlane (ODP), Infrastructure Programmer Development Kit (IPDK), eBPF, x86 compatible executable binaries or other executable binaries.

As described herein, packet formation 310 can perform packet expansion. For example, to perform packet expansion, packet formation 310 can read a single packet segment from memory multiple times, where a number of times the segment is read can be based on a size of the expanded packet. Packet formation 310 can form an intermediate version of an expanded packet that includes a header and portion of the single packet segment at a start of the expanded packet, followed by don't care or filler data, and ending with a valid end of packet indicator. Computation 304 can replace don't care data or filler data with data (e.g., data from another packet, computed data, or stored data).

In some examples, packet formation 310 can be implemented as a virtual switch. A virtual switch 320 can include software and/or hardware device that provides one or more of: inter-virtual machine (VM) communication; support for Link Aggregation Control Protocol (LACP) to control the bundling of several physical ports together to form a single logical channel; support for standard 802.1Q VLAN model with trunking; multicast snooping; IETF Auto-Attach SPBM and rudimentary required LLDP support; BFD and 802.1ag link monitoring; STP (IEEE 802.1D-1998) and RSTP (IEEE 802.1D-2004); fine-grained QoS control; support for HFSC qdisc; per VM interface traffic policing; network interface bonding with source-MAC load balancing, active backup, and layer 4 (L4) hashing; OpenFlow protocol support (including many extensions for virtualization); IPv6 support; support for multiple tunneling protocols (Generic Routing Encapsulation (GRE), Virtual Extensible LAN (VXLAN), Stateless Transport Tunneling (STT), Geneve, with IPsec support); support for remote configuration protocol with C and Python bindings; support for kernel and user-space forwarding engine options; multi-table forwarding pipeline with flow-caching engine; and forwarding layer abstraction to ease porting to new software and hardware platforms. Non-limiting example of virtual switch 104 include Open vSwitch (OVS), vector packet processing (VPP), F5 NGINX, HAProxy, Codefresh, and VMware NSX Data Center, or others.

Server 350 can be coupled to network interface device 300 using a device interface or network connection, examples of which are described herein. Server 350 can include processors 352, memory 360, and other technologies described herein at least with respect to the system of FIG. 10. Offload connection maintenance 354 can manage connections between workers (not shown) and PS 356 based on RDMA RC or other reliable transport protocol. For example, connection maintenance 354 can acknowledge packet receipt to a sender and identify if a packet sequence number is not received from a sender and request packet re-transmission based on connection context 362 stored in memory 360.

Figure 4:
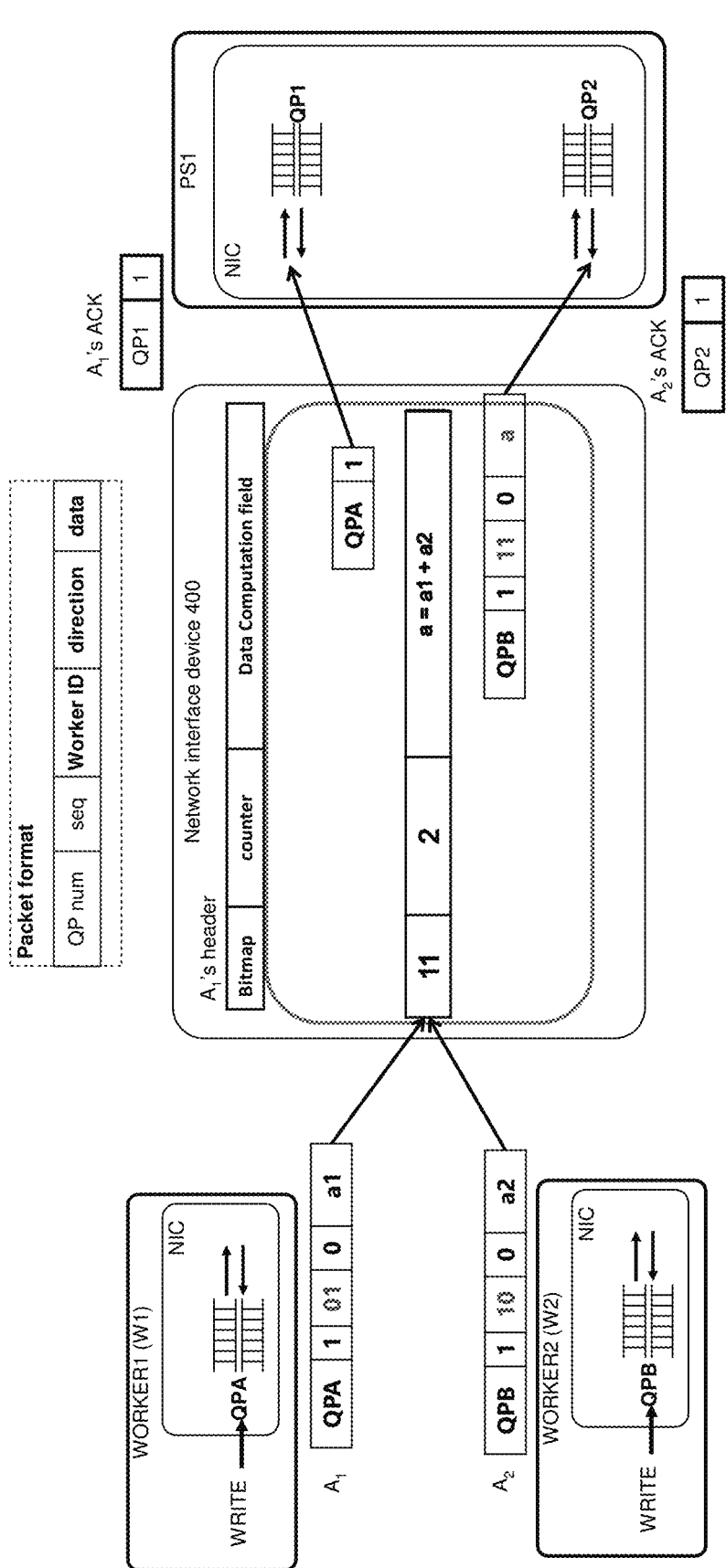
FIG. 4 depicts an example operation of a reduce-scatter operation.

FIG. 4 depicts an example operation of a reduce-scatter operation. An RDMA RC connection can be set up among workers worker1 and worker2 and parameter server PS1. Although examples herein are described with respect to RDMA RC, other reliable transport protocols can be used such as Amazon SRD, ANR2.0, or others. In an ML framework and in connection with training or inference, worker1 and worker2 can provide data (e.g., gradients or coefficients) to PS1. In some examples, PS1 can represent an endpoint.

In a reduce-scatter operation, network interface device 400 can sum data and send data (after receiving data from worker1 W1 and worker2 W2) to PS1. In some examples, W1 can set up an RC connection with QP1 at PS1 and W2 sets up an RC connection with QP2 at PS1. Note that this example is a subset of aggregation from a job. In some examples, there can be as many parameter servers as many as numbers of workers, although the number of parameter servers and number of workers can differ. Packet A1 from W1 arrives at network interface device 400 and A1's data is stored. Network interface device 400 updates a worker counter to reflect receipt of data from W1, and forwards the header to QP1. PS1's network interface controller (NIC) sends an ACK packet to the W1.

Packet A2 from W2 arrives at network interface device 400 and network interface device 400 performs aggregation. Because there are total of two workers, the aggregation is complete. Network interface device 400 can write the aggregated data, e.g., a=a1+a2, to the packet A2 and forwards A2 to the QP2 at PS1. Then, the PS1's NIC sends an ACK for A2 to the W2. Network interface device 400 sends headers of A1 and QP2 to PS1 so that PS1 maintains the RC connection with W1 and W2. Payload processing at network interface device 400 helps reduce network traffic to the PS1.

Figure 5:
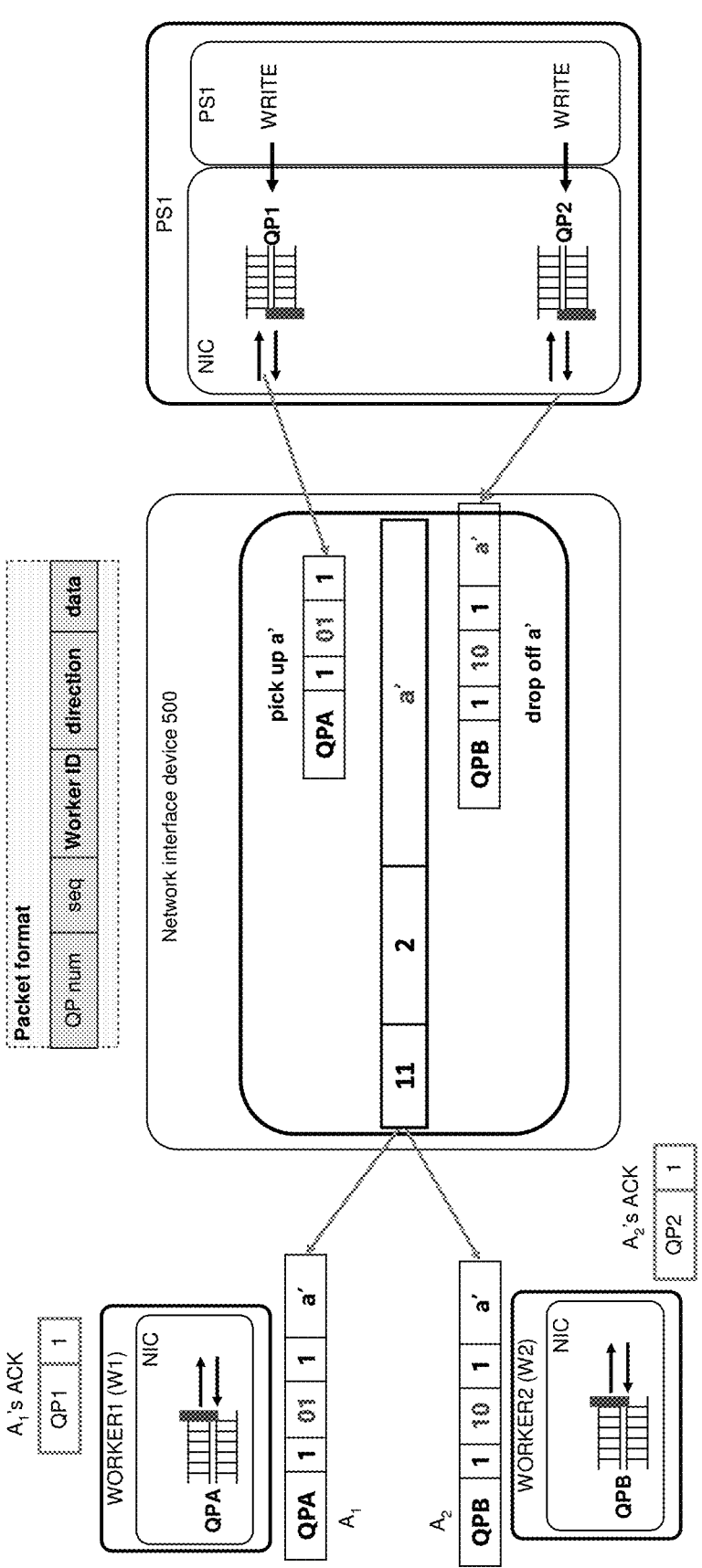
FIG. 5 depicts an example pseudo code of a reduce-scatter operation at a network interface device.

FIG. 5 depicts an example of an Allgather operation. An Allgather operation can distribute results from PS1 to workers W1 and W2. In an Allgather operation, PS1 sends one copy of data to network interface device 500 to distribute to workers W1 and W2 by sending the data in one packet to network interface device 500 and can send dummy packets to network interface device 500 to forward to the rest of the workers (e.g., W2). PS1 can send one copy of the aggregated data to the network interface device 500 to send to a worker and PS1 sends packet header, e.g., the zero-payload RDMA WRITE Only request, to network interface device 500 to append to the aggregated data and send to the other worker (s). PS1 sends packets encoded with the worker id.

PS1 first sends the data, a', from QP2 to network interface device 500. Network interface device 500 can store the data a' (drop off a') and forwards the packet to W2. PS1 can send a dummy packet with a packet header from QP1 but no payload a' to network interface device 500 to forward to W1. However, network interface device 500 can append the payload a' (pick up a') to the packet header and forwards the constructed packet to W1.

If the starting packet sequence numbers (PSN) from different hosts are the same, it might cause the conflicts on the network interface device slots from different parameter servers using the same pool_index. Use of the pool_index_start_point can avoid conflicts on the network interface device slots.

In some examples, network interface device 500's multicast group is not configured for use to send a' to W1 and W2. Use of a built-in multicast group can involve storing QP information to rewrite the packet header as the multicast replicates the same packet to different QPs and the PS's QP sends packets to maintain the connection.

In RDMA RC mode, the control plane and reliability are managed by the end point host systems and connections (e.g., RDMA queue pairs) are established between the end point hosts and hence, packets, even those that are processed in a switch, are to be transmitted to the end point host destination. RDMA RC mode can benefit from bandwidth reduction by truncating Reduce Scatter (or Reduce Scatter part of AllReduce) packets and sending header-only packets to the end point destination. The host can send header-only packets in connection with AllGather (or the AllGather part of AllReduce) operations. A switch can expand header-only packets to include a payload and transmit the expanded packets to the end point destination. Collective operations could benefit from In-Network Compute (INC) at a switch when there is a stream of traffic in order to reduce bandwidth. In the case of AllGather with RDMA RC, a stream of smaller packets can be expanded. For example, a switch can expand a single segment packet into a multi-segment packet.

Figure 6:
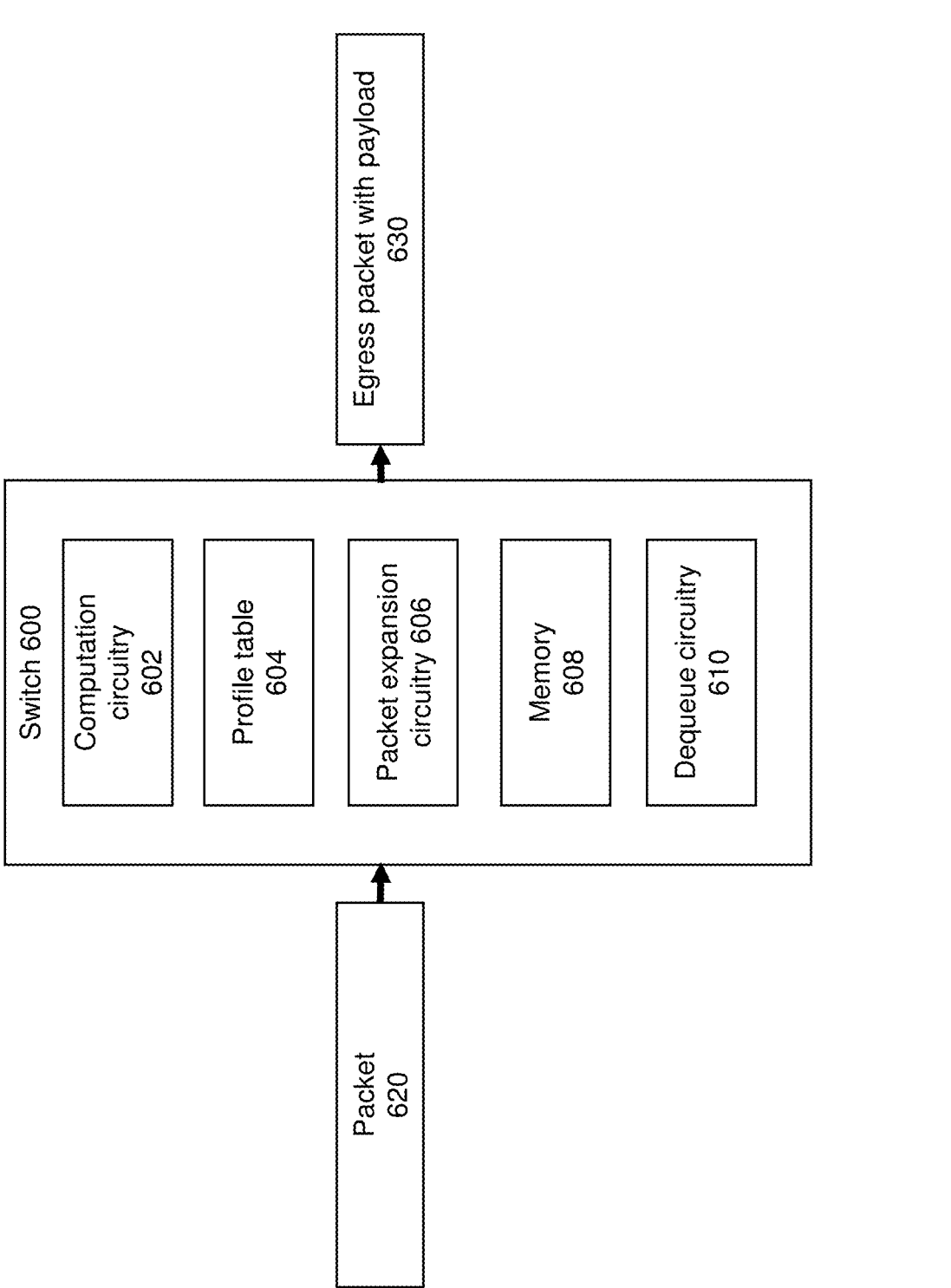
FIG. 6 depicts an example system that can perform packet expansion.

FIG. 6 depicts an example system. Switch 600 can include circuitry 606 to perform header and/or payload expansion of received packet 620 using data from another packet, data in memory 608 or storage, or data generated by computation circuitry 602. For example, computation circuitry 602 can perform calculations on received packet payload data of one or more packets such as one or more of: minimum, maximum, min-max, summation, subtraction, multiplication, division, logical operations (AND, OR, XOR, or others), count, decrement, or others.

For example, based on a profile for ingress packet 620 stored in profile table 604, such as packet flow identifier, packet expansion circuitry 606 can form egress packet 630 with beginning that includes a portion of ingress packet 620 (e.g., header), followed by don't care or filler data, and ending with a valid end of packet (EOP) delineator. The EOP delineator can be used by the switch to indicate an end of a packet and may not be part of a transmitted packet. Packet expansion circuitry 606 can replace don't care or filler data with data from another packet, data in memory 608 or storage, or data generated by computation circuitry 602. Switch 600 can provide egress packet 630 to an egress port for transmission to another switch, a network interface device, or endpoint host.

Packet expansion circuitry 606 can include or access a packet processing pipeline that can mark packets to be expanded based on content of profile table 604. When scheduling marked packets to be expanded for de-queue from memory 608, packet expansion circuitry 606 can read the packet segment multiple times instead of a single time. In other words, the packet memory segment that was occupied by a single-segment packet is not released in egress packet 630 until it is read multiple times to create an expanded packet. Packet expansion circuitry 606 can perform packet expansion by accessing a stored single copy of a packet segment from memory 608 without extra memory usage to store additional copies of the packet. The number of times the segment is read before it is released can be based on a size of the expanded packet. The expanded packet can comply with a scheduling rule and not cause throughput impact to other ports.

For example, after receipt of a packet and removal of the packet's payload or prior to egress of a packet modified or expanded, packet expansion circuitry 606 can modify a header of the packet. For example, a header of the packet can be updated to change a length field indicative of a length of a packet (e.g., header and payload) or length of payload or checksum or cyclic redundancy check (CRC) value. For example, a length field can be updated in one or more of: Ethernet header, IP header, TCP header, UDP header, IBTA header, or others. One or more checksum or CRC values can be calculated and inserted into one or more packet headers or in an end of a packet.

Dequeue circuitry 610 can perform traffic shaping for an egress port and associated queue and can take into account the size of the expanded packet (e.g., packet 630) after expansion for traffic shaping. In some examples, dequeue circuitry 610 can perform traffic scheduling for egress packets, including egress packet 630.

Figure 7:
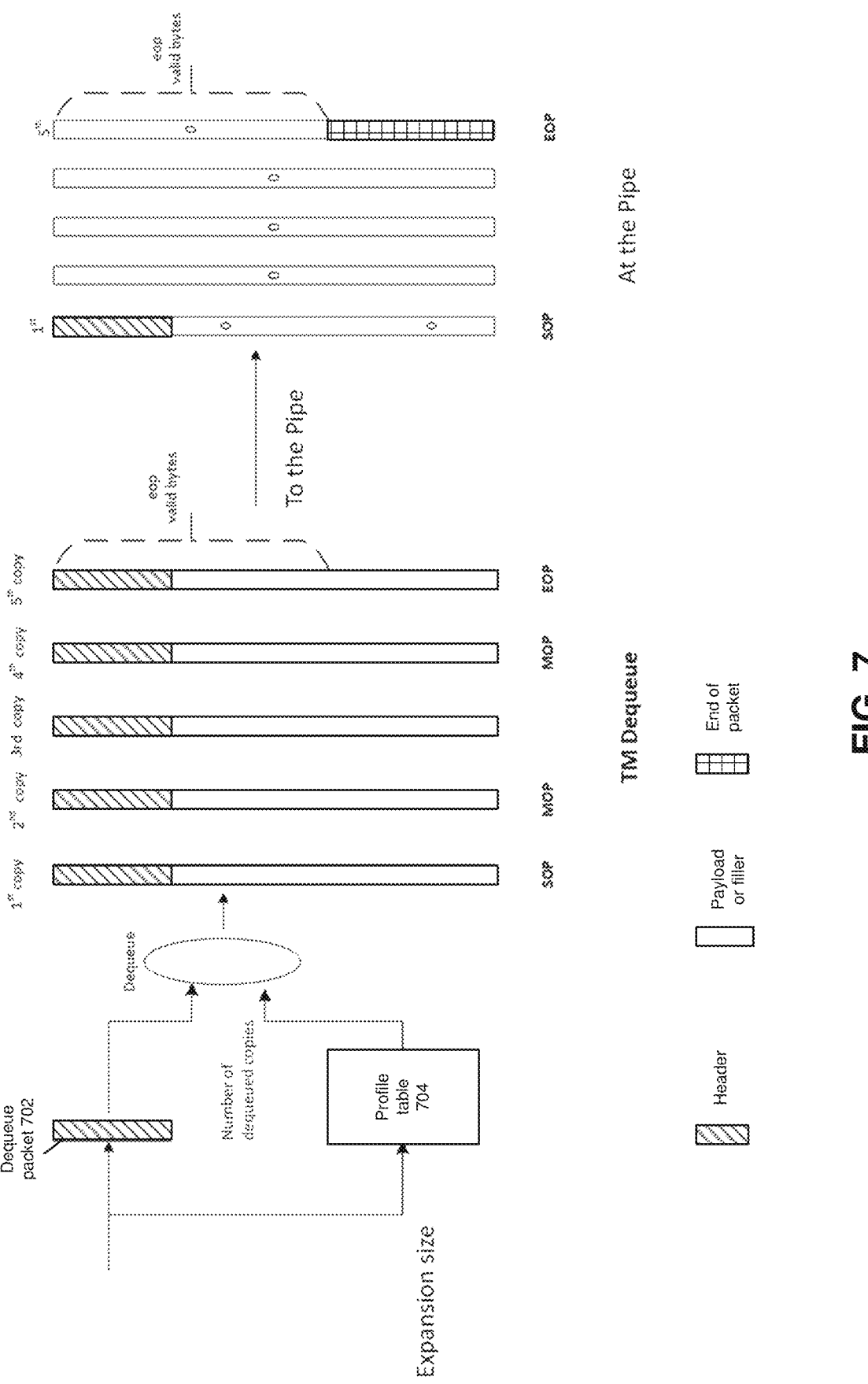
FIG. 7 depicts an example of packet expansion.

FIG. 7 depicts an example of operations. Based on dequeuing of packet 702 with header and payload or zero length payload, profile table 704 can be accessed. A profile table 704 can be implemented as a match-action table. An action for packet 702 can be looked up based on the packet's N-tuple of a header. An action can specify to expand or not expand the packet or copy the packet to create a larger packet from copies of the packet, a number of copies of dequeue packet 702 to dequeue, and size of the resulting packet (e.g., number of bytes in the expanded packet).

A traffic manager (TM) (e.g., described with respect to FIG. 9A) can dequeue a number of copies of packet 702 specified by profile table 704 into a packet processing pipeline, sequentially. For example, packet 702 can be expanded to include filler data and five copies of packet 702 with added filler data can be loaded into a packet processing pipeline. In this example, a single copy of packet 702 is stored in content memory and can be read multiple times to generate a multi-segment packet. For example, packet 702 can be copied into a pipeline sequentially from header region of $1^{st}$ copy of packet 702 to bottom of filler of $5^{th}$ copy of packet 702. Pipeline can replace filler data (e.g., zero or don't care data) of $2^{nd}$-$4^{th}$ copies of packet 702 with data loaded from memory or storage. A length of each copy can be based on a configuration parameter specified by a data center administrator. Pipeline can insert an end of packet (EOP) valid bytes, which can be filled with filler data and can be followed by invalid bytes, at the end of the $5^{th}$ copy of packet 702 with filler data. Pipeline can utilize the EOP to identify an end of the packet for utilization by the pipeline. Pipeline can insert one or more packet checksum or CRC values in one or more packet headers or at an end of a packet prior to egress.

Figure 8A:
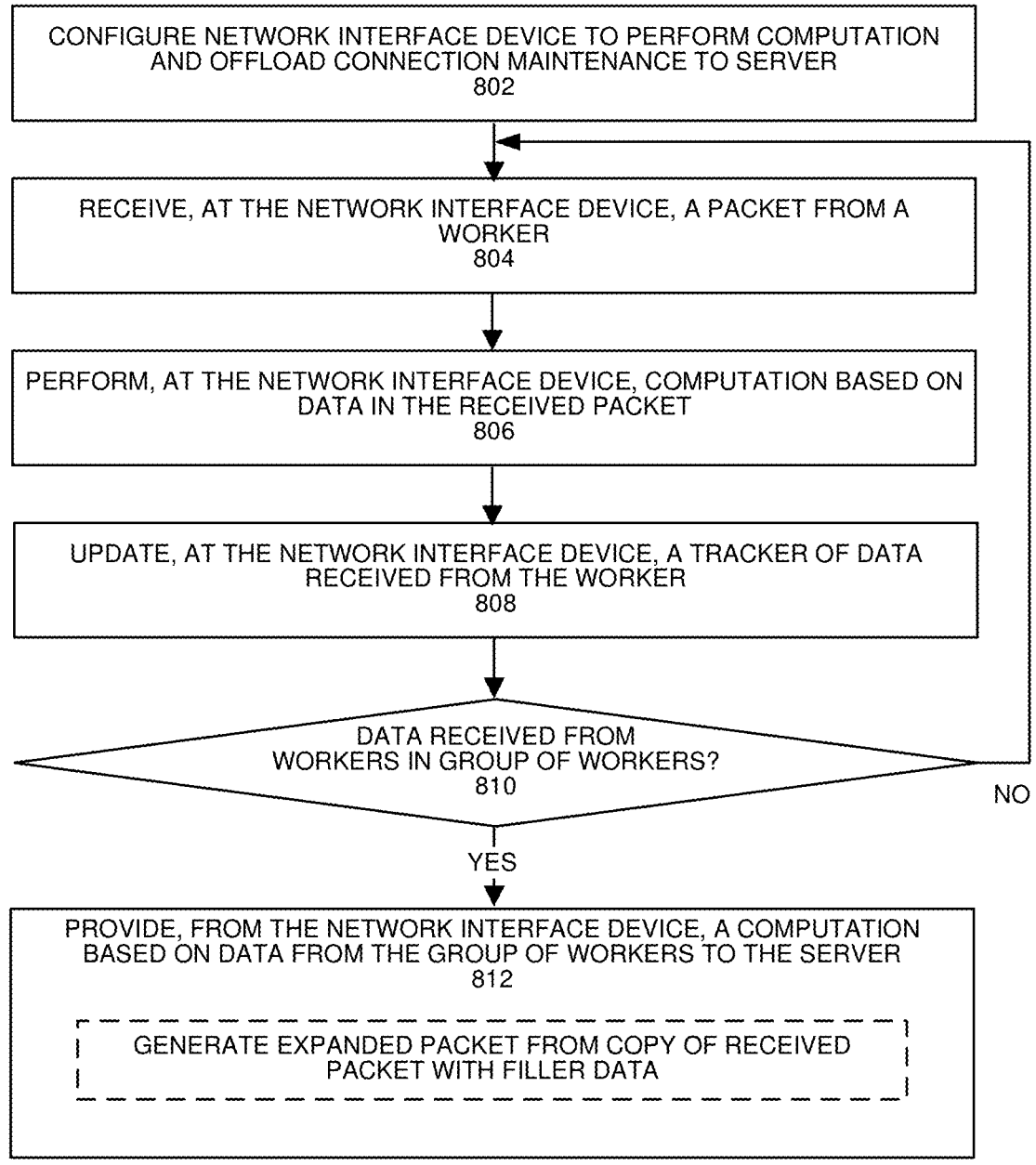

FIG. 8A depicts an example process that can be performed at a network interface device. At 802, a network interface device can be configured to perform computation related to at least ReduceScatter, Allgather, or Allreduce for data from workers on behalf of a server. In some examples, the server can be a parameter server. In some examples, the network interface device can be configured to perform data computations (e.g., summation, subtraction, min-max, or other algebraic operations) on data received in packets. In some examples, the network interface device can be configured to forward headers of received packets to the parameter server to offload connection maintenance to the parameter server.

At 804, the network interface device can receive a packet from a worker. The packet can indicate a pool index starting point, identify a worker that sent the packet, and a direction of operation to perform on the data. At 806, the network interface device can perform a computation on the received data based on the indicated operation to perform on the data. In some examples, the data can include a gradient or coefficient, or other values in connection with ML or DNN training or inference. The network interface device can store a result of the computation into a memory slot identified based on the pool index starting point. At 808, the network interface device can update a tracker of which worker contributed data. For example, the network interface device can count unique workers in a group of workers associated with the operation that have contributed data. At 810, a determination can be made if all of the workers in the group of workers associated with the operation have contributed data. Based on all of the workers in the group of workers associated with the operation have contributed data, the process can proceed to 812, where network interface device can send a packet to the parameter server with an aggregate computation determined based on data from workers in the group of workers associated with the operation. Based on less than all of the workers in the group of workers associated with the operation have contributed data, the process can proceed to 804. In some examples, at 812, the network interface device can generate an expanded packet based on multiple copies of a received packet with filler data and replace filler data with data and include an end of packet indicator in the expanded packet. For example, a header of the packet can be updated to change a length field indicative of a length of a packet (e.g., header and payload) or length of payload or checksum or cyclic redundancy check (CRC) value. For example, a length field can be updated in one or more of: Ethernet header, IP header, TCP header, UDP header, IBTA header, or others. One or more checksum or CRC values can be placed in one or more packet headers or at an end of the packet.

FIG. 8B depicts an example process that can be performed at a network interface device. At 850, a network interface device can be configured to perform distribution of computed results from a parameter server or the network interface device related to at least ReduceScatter, Allgather, or Allreduce to workers on behalf of a parameter server. In some examples, the network interface device can be configured to perform data computations (e.g., summation, subtraction, min-max, or other algebraic operations) on data received in packets.

At 852, the network interface device can receive computed result data in a packet from a server to send the computed result data to workers in a worker group. At 854, the network interface device can receive a packet with no data (dummy packet) from the server and the network interface device is to include the computed result data to the dummy packet to send the computed result data to a worker identified in the header of the dummy packet.

In some examples, at 854, the computed result data may be stored in the network interface device and the server can send a dummy packet to the network interface device targeted to workers of the work group and the network interface device can include the computed result data in the received dummy packet and forward the dummy packet with the computed result data to the worker.

In some examples, at 854, the network interface device can generate an expanded packet based on multiple copies of a received packet with filler data and replace filler data with data and include an end of packet indicator in the expanded packet. For example, a header of the packet can be updated to change a length field indicative of a length of a packet (e.g., header and payload) or length of payload or checksum or cyclic redundancy check (CRC) value. For example, a length field can be updated in one or more of: Ethernet header, IP header, TCP header, UDP header, IBTA header, or others. One or more computed checksums or CRC values can be computed and inserted in one or more packet headers or at an end of a packet.

Figure 9A:
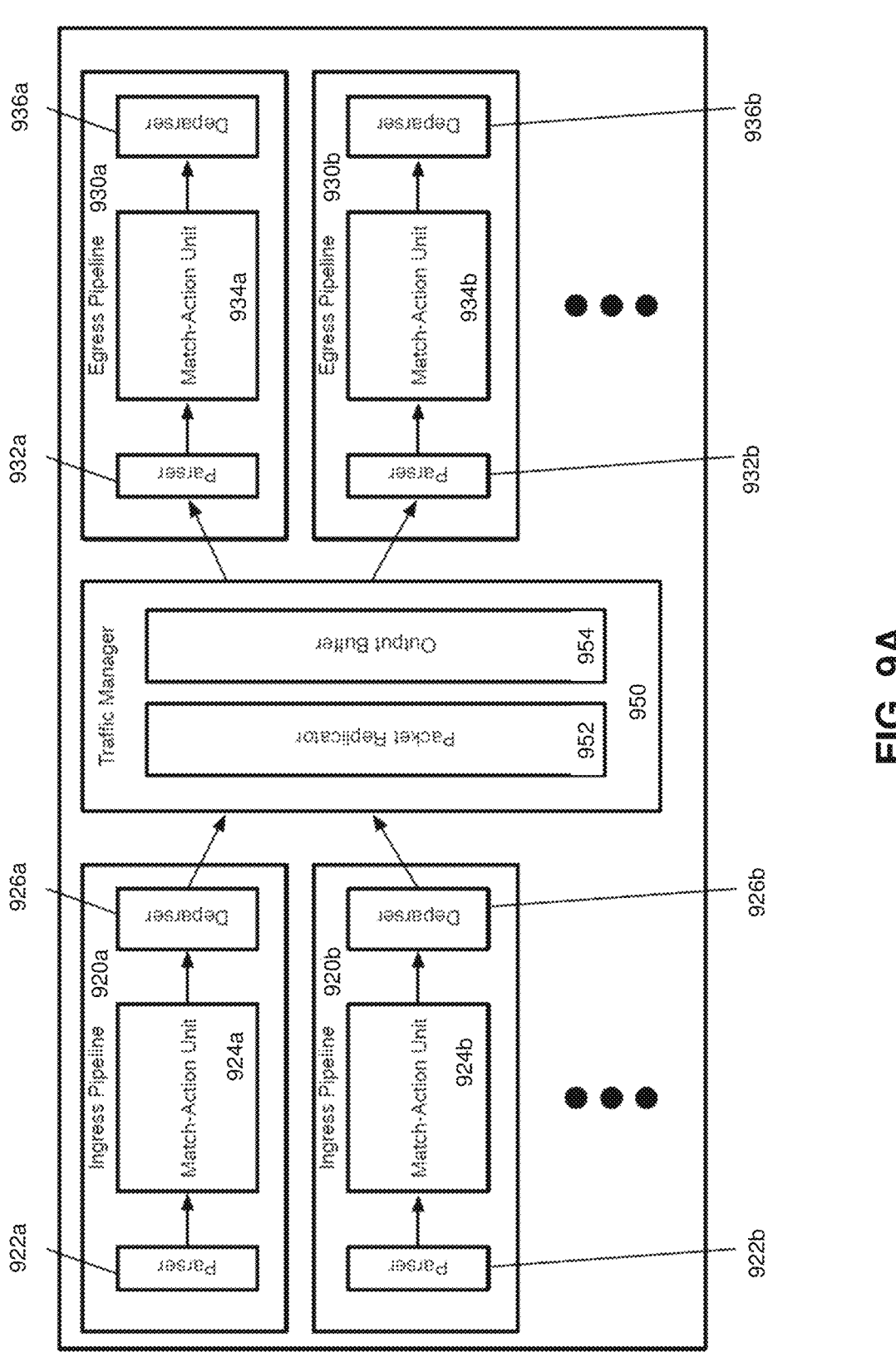
FIG. 9A depicts an example network interface device.

FIG. 9A depicts an example network forwarding system that can be used as a network interface device or router. For example, FIG. 9A illustrates several ingress pipelines 920, a traffic management unit (referred to as a traffic manager) 950, and several egress pipelines 930. Though shown as separate structures, in some examples the ingress pipelines 920 and the egress pipelines 930 can use the same circuitry resources. At least traffic manager 950 and egress pipelines 930 can generate an expanded packet based on multiple copies of a received packet with filler data and replace filler data with data and include an end of packet indicator in the expanded packet.

Operation of pipelines can be programmed using Programming Protocol-independent Packet Processors (P4), C, Python, Broadcom NPL, or x86 compatible executable binaries or other executable binaries. In some examples, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other examples, the ingress and egress pipelines are separate circuitry. In some of these other examples, the ingress pipelines also process the non-packet data.

In some examples, in response to receiving a packet, the packet is directed to one of the ingress pipelines 920 where an ingress pipeline may correspond to one or more ports of a hardware forwarding element. After passing through the selected ingress pipeline 920, the packet is sent to the traffic manager 950, where the packet is enqueued and placed in the output buffer 954. In some examples, the ingress pipeline 920 that processes the packet specifies into which queue the packet is to be placed by the traffic manager 950 (e.g., based on the destination of the packet or a flow identifier of the packet). The traffic manager 950 then dispatches the packet to the appropriate egress pipeline 930 where an egress pipeline may correspond to one or more ports of the forwarding element. In some examples, there is no necessary correlation between which of the ingress pipelines 920 processes a packet and to which of the egress pipelines 930 the traffic manager 950 dispatches the packet. That is, a packet might be initially processed by ingress pipeline 920b after receipt through a first port, and then subsequently by egress pipeline 930a to be sent out a second port, etc.

A least one ingress pipeline 920 includes a parser 922, a chain of multiple match-action units or circuitry (MAUs) 924, and a deparser 926. Similarly, egress pipeline 930 can include a parser 932, a chain of MAUs 934, and a deparser 936. The parser 922 or 932, in some examples, receives a packet as a formatted collection of bits in a particular order, and parses the packet into its constituent header fields. In some examples, the parser starts from the beginning of the packet and assigns header fields to fields (e.g., data containers) for processing. In some examples, the parser 922 or 932 separates out the packet headers (up to a designated point) from the payload of the packet, and sends the payload (or the entire packet, including the headers and payload) directly to the deparser without passing through the MAU processing. Egress parser 932 can use additional metadata provided by the ingress pipeline to simplify its processing.

The MAUs 924 or 934 can perform processing on the packet data. In some examples, the MAUs includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, using MAU(s), packet processing, receipt of worker data, forwarding a packet header from a worker to a server, or insertion of computed result data into packets to be sent to workers, as described herein.

The deparser 926 or 936 can reconstruct the packet using the PHV as modified by the MAU 924 or 934 and the payload received directly from the parser 922 or 932. The deparser can construct a packet that can be sent out over the physical network, or to the traffic manager 950. In some examples, the deparser can construct this packet based on data received along with the PHV that specifies the protocols to include in the packet header, as well as its own stored list of data container locations for each possible protocol's header fields.

Traffic manager (TM) 950 can include a packet replicator 952 and output buffer 954. In some examples, TM 950 can provide packet copies to egress pipeline 930a-930b to perform packet expansion operations, as described herein. In some examples, the traffic manager 950 may include other components, such as a feedback generator for sending signals regarding output port failures, a series of queues and schedulers for these queues, queue state analysis components, as well as additional components. Packet replicator 952 of some examples performs replication for broadcast/multicast packets, generating multiple packets to be added to the output buffer (e.g., to be distributed to different egress pipelines).

The output buffer 954 can be part of a queuing and buffering system of the traffic manager in some examples. The traffic manager 950 can provide a shared buffer that accommodates any queuing delays in the egress pipelines. In some examples, this shared output buffer 954 can store packet data, while references (e.g., pointers) to that packet data are kept in different queues for each egress pipeline 930. The egress pipelines can request their respective data from the common data buffer using a queuing policy that is control-plane configurable. When a packet data reference reaches the head of its queue and is scheduled for dequeuing, the corresponding packet data can be read out of the output buffer 954 and into the corresponding egress pipeline 930.

Figure 9B:
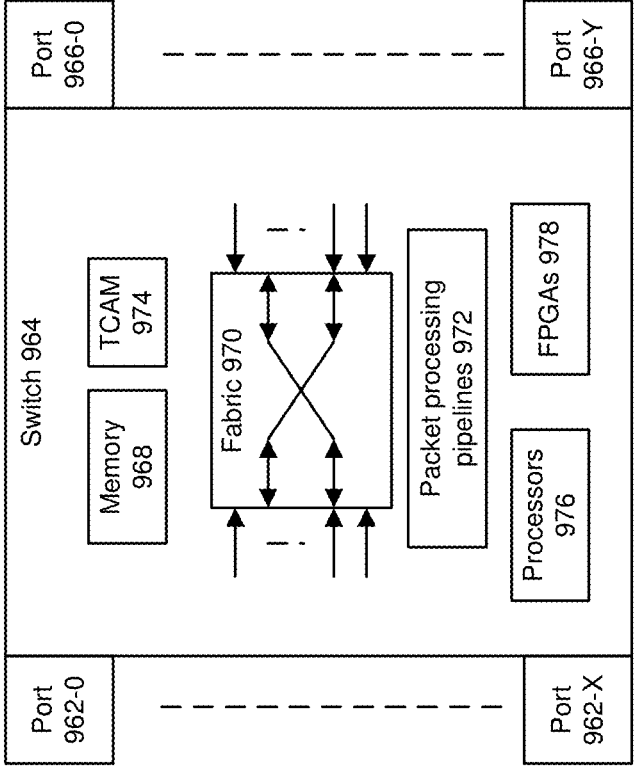
FIG. 9B depicts an example switch.

FIG. 9B depicts an example switch. Various examples can be used in or with the switch to generate an expanded packet based on multiple copies of a received packet with filler data and replace filler data with data and include an end of packet indicator in the expanded packet. The switch can be implemented as a system on chip (SoC). Switch 964 can route packets or frames of any format or in accordance with any specification from any port 962-0 to 962-X to any of ports 966-0 to 966-Y (or vice versa). Any of ports 962-0 to 962-X can be connected to a network of one or more interconnected devices. Similarly, any of ports 966-0 to 966-Y can be connected to a network of one or more interconnected devices.

In some examples, switch fabric 970 can provide routing of packets from one or more ingress ports for processing prior to egress from switch 964. Switch fabric 970 can be implemented as one or more multi-hop topologies, where example topologies include torus, butterflies, buffered multi-stage, etc., or shared memory switch fabric (SMSF), among other implementations. SMSF can be any switch fabric connected to ingress ports and egress ports in the switch, where ingress subsystems write (store) packet segments into the fabric's memory, while the egress subsystems read (fetch) packet segments from the fabric's memory.

Memory 968 can be configured to store packets received at ports prior to egress from one or more ports. Packet processing pipelines 972 can determine which port to transfer packets or frames to using a table that maps packet characteristics with an associated output port. Packet processing pipelines 972 can be configured to perform match-action on received packets to identify packet processing rules and next hops using information stored in a ternary content-addressable memory (TCAM) tables or exact match tables in some examples. For example, match-action tables or circuitry can be used whereby a hash of a portion of a packet is used as an index to find an entry. Packet processing pipelines 972 can implement access control list (ACL) or packet drops due to queue overflow. Packet processing pipelines 972 can be configured to perform in-network computation, dummy packet forwarding or modification to add or remove a payload, as described herein. Configuration of operation of packet processing pipelines 972, including its data plane, can be programmed using configuration file, OneAPI, Programming protocol independent packet processors (P4), Software for Open Networking in the Cloud (SONiC), Broadcom® Network Programming Language (NPL), NVIDIA® CUDA®, NVIDIA® DOCA™, Data Plane Development Kit (DPDK), OpenDataPlane (ODP), Infrastructure Programmer Development Kit (IPDK), eBPF, x86 compatible executable binaries or other executable binaries. Processors 976 and FPGAs 978 can be utilized for packet processing or modification.

Figure 9C:
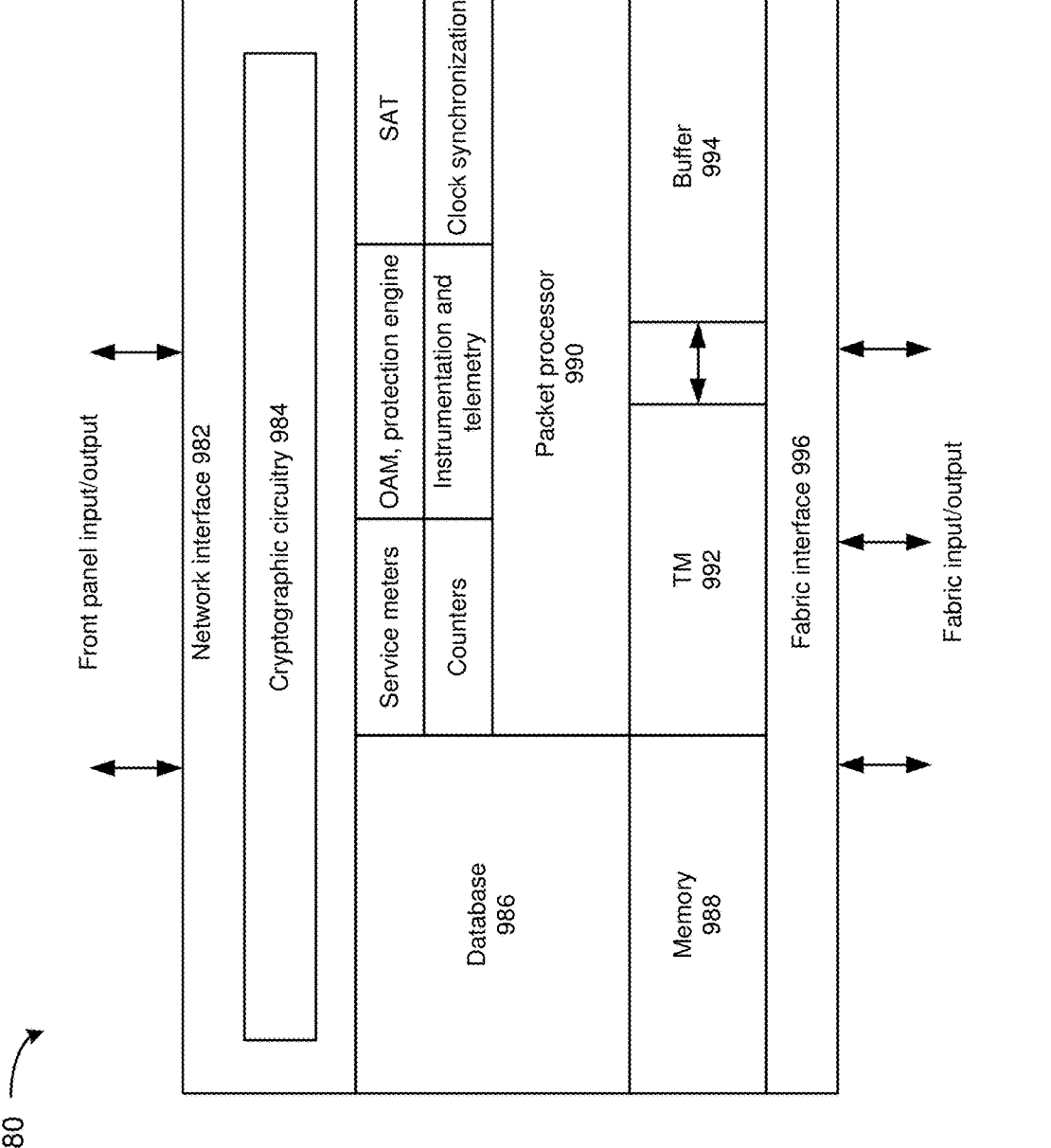
FIG. 9C depicts an example switch.

FIG. 9C depicts an example switch. Various examples can be used in or with the switch to generate an expanded packet based on multiple copies of a received packet with filler data and replace filler data with data and include an end of packet indicator in the expanded packet. Switch 980 can include a network interface 980 that can provide an Ethernet consistent interface. Network interface 980 can support for 25 GbE, 50 GbE, 100 GbE, 200 GbE, 400 GbE Ethernet port interfaces. Cryptographic circuitry 984 can perform at least Media Access Control security (MACsec) or Internet Protocol Security (IPSec) decryption for received packets or encryption for packets to be transmitted.

Various circuitry can perform one or more of: service metering, packet counting, operations, administration, and management (OAM), protection engine, instrumentation and telemetry, and clock synchronization (e.g., based on IEEE 1588).

Database 986 can store a device's profile to configure operations of switch 980. Memory 988 can include High Bandwidth Memory (HBM) for packet buffering. Packet processor 990 can perform one or more of: packet forwarding, packet counting, access-list operations, bridging, routing, Multiprotocol Label Switching (MPLS), virtual private LAN service (VPLS), L2VPNs, L3VPNs, OAM, Data Center Tunneling Encapsulations (e.g., VXLAN and NV-GRE), or others. Packet processor 990 can be configured to perform packet expansion and header modification as described herein. Packet processor 990 can include one or more FPGAs. Buffer 994 can store one or more packets. Traffic manager (TM) 992 can provide per-subscriber bandwidth guarantees in accordance with service level agreements (SLAs) as well as performing hierarchical quality of service (QoS). Fabric interface 996 can include a serializer/deserializer (SerDes) and provide an interface to a switch fabric.

Figure 10:
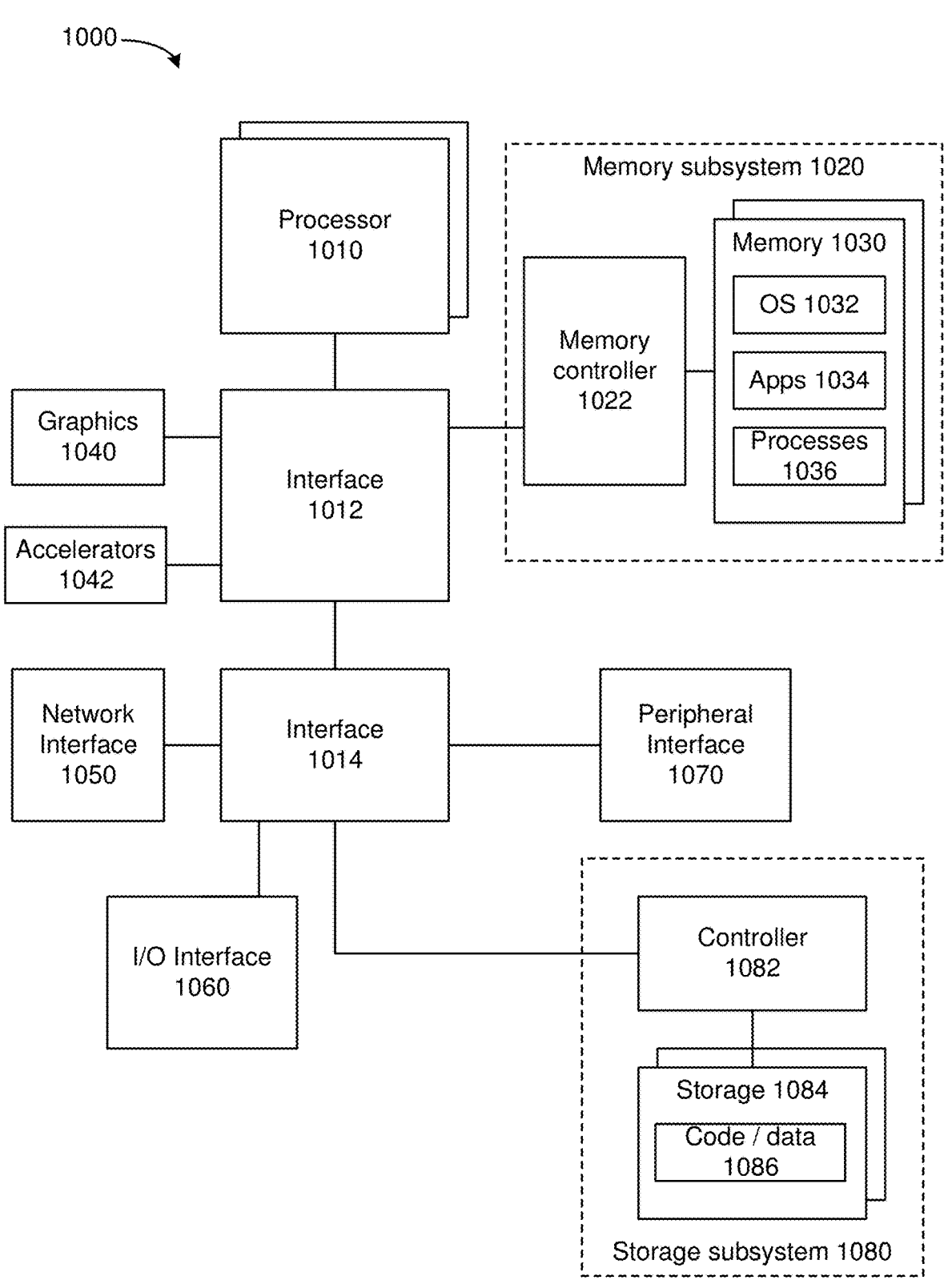
FIG. 10 depicts an example system.

FIG. 10 depicts an example computing system. Components of system 1000 (e.g., processor 1010, network interface 1050, and so forth) to perform packet processing, receipt of worker data, forward a packet header from a worker to a server, insertion of computed result data into packets to be sent to workers, or generation of an expanded packet based on multiple copies of a received packet with filler data and replace filler data with data and include an end of packet indicator in the expanded packet, as described herein. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function or programmable offload engine that can be accessed or used by a processor 1010. For example, an accelerator among accelerators 1042 can provide compression (DC) capability, cryptography services such as public key encryption (PKE), cipher, hash/authentication capabilities, decryption, or other capabilities or services. In some examples, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

In some examples, OS 1032 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

In some examples, a driver can configure network interface 1050 to perform packet processing, receipt of worker data, forward a packet header from a worker to a server, insertion of computed result data into packets to be sent to workers, or generation of an expanded packet based on multiple copies of a received packet with filler data and replace filler data with data and include an end of packet indicator in the expanded packet, as described herein. In some examples, a driver can enable or disable offload to network interface 1050 performance of perform packet processing, receipt of worker data, forward a packet header from a worker to a server, insertion of computed result data into packets to be sent to workers, or generation of an expanded packet based on multiple copies of a received packet with filler data and replace filler data with data and include an end of packet indicator in the expanded packet, as described herein, as described herein. A driver can advertise capability of network interface 1050 to perform one or more aspects of network interface 1050 to perform packet processing, receipt of worker data, forward a packet header from a worker to a server, insertion of computed result data into packets to be sent to workers, or generation of an expanded packet based on multiple copies of a received packet with filler data and replace filler data with data and include an end of packet indicator in the expanded packet, as described herein. Network interface 1050 can advertise capabilities to perform packet processing, receipt of worker data, forward a packet header from a worker to a server, insertion of computed result data into packets to be sent to workers, or generation of an expanded packet based on multiple copies of a received packet with filler data and replace filler data with data and include an end of packet indicator in the expanded packet, as described herein. Based on commands from a driver, network interface 1050 can perform packet processing, receipt of worker data, forward a packet header from a worker to a server, insertion of computed result data into packets to be sent to workers, or generation of an expanded packet based on multiple copies of a received packet with filler data and replace filler data with data and include an end of packet indicator in the expanded packet, as described herein.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory.

Some examples of network interface 1050 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1000 includes storage subsystem 1080 to store data in a nonvolatile manner. A volatile memory is memory whose state (and therefore the data stored in it) is indeterminate if power is interrupted to the device.

In an example, system 1000 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Examples herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or examples. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An example of the devices, systems, and methods may include any one or more, and any combination of, the examples described below.

Example 1 includes one or more examples, and includes an apparatus comprising: a network interface device comprising: circuitry, when operational, to: receive a first packet comprising a first packet header and a first packet payload; receive multiple subsequent packets comprising multiple packet headers for respective multiple subsequent packets; update at least one of the multiple packet headers; and construct egress packets, wherein the egress packets comprise respective one of the multiple packet headers and the first packet payload.

Example 2 includes one or more examples, wherein at least one of the multiple subsequent packets comprises a payload with fewer bytes than the first packet payload.

Example 3 includes one or more examples, wherein at least one of the multiple subsequent packets comprises a payload with zero bytes.

Example 4 includes one or more examples, wherein the circuitry is to: perform a multicast operation to transmit the egress packets with the first packet payload but with at least one different header field.

Example 5 includes one or more examples, wherein the circuitry is to: construct egress packets, wherein the egress packets comprise respective one of the multiple packet headers and payloads of the egress comprise data generated by computations in the network interface device.

Example 6 includes one or more examples, wherein the circuitry is to: construct egress packets, wherein the egress packets comprise respective one of the multiple packet headers and data accessed from a connected memory device.

Example 7 includes one or more examples, wherein the circuitry is to: construct at least one of the egress packets based on a header of one of the multiple subsequent packets and the first packet payload by accessing multiple copies of the header of one of the multiple subsequent packets, addition of filler data, and replacement of at least a portion of the filler data with the first packet payload and an end of packet indicator.

Example 8 includes one or more examples, wherein the first packet payload is associated with one or more of Allreduce, ReduceScatter, or Allgather operations of a machine learning (ML) model training operation.

Example 9 includes one or more examples, wherein the circuitry comprises: programmable data plane circuitry configured to perform one or more match action operations to construct the egress packets.

Example 10 includes one or more examples, wherein the network interface device comprises one or more of: network interface controller (NIC), switch, SmartNIC, router, forwarding element, infrastructure processing unit (IPU), data processing unit (DPU), or virtual switch.

Example 11 includes one or more examples, and includes a method that includes: receiving a first packet comprising a first packet header and a first packet payload; receiving multiple subsequent packets comprising multiple packet headers for respective multiple subsequent packets; and constructing egress packets, wherein the egress packets comprise respective one of the multiple packet headers and the first packet payload.

Example 12 includes one or more examples, wherein at least one of the multiple subsequent packets comprises a payload with fewer bytes than the first packet payload.

Example 13 includes one or more examples, and includes performing a multicast operation to transmit the egress packets with the first packet payload but with at least one different header field.

Example 14 includes one or more examples, and includes constructing a second group of one or more egress packets, wherein the second group of one or more egress packets comprise respective one of the multiple packet headers and data generated by computations in a switch.

Example 15 includes one or more examples, and includes constructing a second group of one or more egress packets, wherein the second group of one or more egress packets comprise respective one of the multiple packet headers and data accessed from a connected memory device.

Example 16 includes one or more examples, and includes a non-transitory computer-readable medium comprising instructions stored thereon, that if executed by circuitry of a network interface device, cause the circuitry of the network interface device to: receive a first packet comprising a first packet header and a first packet payload; receive a second packet comprising a second packet header; and form an egress packet based on the second packet header and the first packet payload.

Example 17 includes one or more examples, wherein the second packet comprises a payload with fewer bytes than the first packet payload.

Example 18 includes one or more examples, and includes instructions stored thereon, that if executed by circuitry of a network interface device, cause the circuitry of the network interface device to: perform a multicast operation to transmit the egress packet with the first packet payload and with different header fields.

Example 19 includes one or more examples, and includes instructions stored thereon, that if executed by circuitry of a network interface device, cause the circuitry of the network interface device to: form a second egress packet based on data generated by computations in a network interface device.

Example 20 includes one or more examples, and includes instructions stored thereon, that if executed by circuitry of a network interface device, cause the circuitry of the network interface device to: form a second egress packet based on data accessed from a connected memory device.

What is claimed is:

1. An apparatus comprising:
a network device comprising:
circuitry to:
    receive a first packet comprising a first packet header and a first packet payload;
    receive, from at least one sender network device, multiple packets comprising multiple packet headers for respective multiple packets, wherein the multiple packets comprise payloads having a size of zero bytes;
    update length fields of packet headers of the multiple packets comprising payloads having the size of zero bytes to indicate a size of the first packet payload;
    construct egress packets, wherein the egress packets comprise respective updated length fields of the packet headers and the payload of the first packet; and
    cause transmission of the egress packets.

2. The apparatus of claim 1, wherein at least one of the multiple packets comprises a payload with fewer bytes than the payload of the first packet.

3. The apparatus of claim 1, wherein the circuitry is to:
perform a multicast operation to transmit the egress packets with the payload of the first packet but with at least one different header field.

4. The apparatus of claim 1, wherein the circuitry is to:
construct a payload of at least one of the egress packets to include data generated by computations in the network device.

5. The apparatus of claim 1, wherein the circuitry is to:
construct a payload of at least one of the egress packets to include data accessed by the network device from a connected memory device.

6. The apparatus of claim 1, wherein the circuitry is to:
construct at least one of the egress packets based on a header of one of the multiple packets and the first packet payload by: access of multiple copies of the header of one of the multiple packets, addition of filler data, and replacement of at least a portion of the filler data with the payload of the first packet and an end of packet indicator.

7. The apparatus of claim 1, wherein the payload of the first packet is associated with one or more of Allreduce, ReduceScatter, or Allgather operations of a machine learning (ML) model training operation.

8. The apparatus of claim 1, wherein the circuitry comprises:
programmable data plane circuitry configured to perform one or more match action operations to construct the egress packets.

9. The apparatus of claim 1, wherein the network device comprises one or more of: network interface controller (NIC), switch, SmartNIC, router, forwarding element, infrastructure processing unit (IPU), data processing unit (DPU), or virtual switch.

10. The apparatus of claim 1, wherein the circuitry is to:
construct a payload of at least one of the egress packets to include data generated by computations in the network device and
construct a payload of at least one of the egress packets to include data accessed by the network device from a connected memory device.

11. The apparatus of claim 1, wherein:
the multiple packet headers identify workers in a parameter server (PS) architecture.

12. A method comprising:

a switch performing:

receiving a first packet comprising a first packet header and a first packet payload;

receiving multiple packets comprising multiple packet headers for respective multiple packets, wherein the multiple packets comprise payloads having a size of zero bytes;

constructing egress packets, wherein the egress packets comprise respective updated length fields of the multiple packet headers for the respective multiple packets and the first packet payload; and causing transmission of the egress packets.

13. The method of claim 12, wherein at least one of the multiple packets comprises a payload with fewer bytes than the first packet payload.

14. The method of claim 12, comprising:

performing a multicast operation to transmit the egress packets with the first packet payload but with at least one different header field.

15. The method of claim 12, comprising:

constructing a second group of one or more egress packets, wherein the second group of one or more egress packets comprises one of the multiple packet headers and data generated by computations in the switch.

16. The method of claim 12, comprising:

constructing a second group of one or more egress packets, wherein the second group of one or more egress packets comprises one of the multiple packet headers and data accessed by the switch from a connected memory device.

17. At least one non-transitory computer-readable medium comprising instructions stored thereon, that when executed by circuitry of a network device, cause the circuitry of the network device to:

receive a first packet comprising a first packet header and a first packet payload;

receive a second packet comprising a second packet header, wherein the second packet comprises a payload with zero bytes;

update a length field of the second packet to indicate a size of the first packet payload;

form an egress packet comprising the second packet header with updated length field and the first packet payload; and cause transmission of the egress packet.

18. The computer-readable medium of claim 17, comprising instructions stored thereon, that if executed by circuitry of a network device, cause the circuitry of the network device to:

perform a multicast operation to transmit the egress packet with the first packet payload and with different header fields.

19. The computer-readable medium of claim 17, comprising instructions stored thereon, that if executed by circuitry of a network device, cause the circuitry of the network device to:

form a second egress packet comprising the second packet header and a payload comprising data generated by computations in a network device.

20. The computer-readable medium of claim 17, comprising instructions stored thereon, that if executed by circuitry of a network device, cause the circuitry of the network device to:

form a second egress packet comprising the second packet header and comprising data accessed from a connected memory device.

* * * * *